(12) United States Patent
Allen et al.

(10) Patent No.: US 7,356,655 B2
(45) Date of Patent: Apr. 8, 2008

(54) METHODS, SYSTEMS, AND MEDIA FOR MANAGING DYNAMIC STORAGE

(75) Inventors: Kenneth Roger Allen, Rochester, MN (US); Richard Karl Kirkman, Rochester, MN (US); Patrick Joseph McCarthy, Rochester, MN (US); Wade Byron Ouren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 10/438,393

(22) Filed: May 15, 2003

(65) Prior Publication Data

US 2004/0230762 A1 Nov. 18, 2004

(51) Int. Cl.
*G06F 12/00* (2006.01)

(52) U.S. Cl. .................. 711/153; 707/205; 711/170; 718/104

(58) Field of Classification Search ............ 711/170, 711/171, 172, 173, 153; 707/205, 206; 718/104
See application file for complete search history.

(56) References Cited

U.S. PATENT DOCUMENTS

| | | | | |
|---|---|---|---|---|
| 5,561,786 A | * | 10/1996 | Morse | 711/170 |
| 5,978,892 A | * | 11/1999 | Noel et al. | 711/170 |
| 5,991,893 A | * | 11/1999 | Snider | 714/4 |
| 6,154,823 A | * | 11/2000 | Benayon et al. | 711/171 |
| 6,253,226 B1 | * | 6/2001 | Chidambaran et al. | 718/104 |
| 6,353,898 B1 | * | 3/2002 | Wipfel et al. | 714/48 |
| 2004/0221120 A1 | * | 11/2004 | Abrashkevich et al. | 711/170 |

OTHER PUBLICATIONS

Microsoft Computer Dictionary, 5th Edition, 2002, Microsoft Press, pp. 249-250.*
U.S. Appl. No. 10/403,150, "Application-Based Control of Hardware Resource Allocation," Lynn K. Chung et al., filed Mar. 31, 2003.

* cited by examiner

*Primary Examiner*—Donald Sparks
*Assistant Examiner*—Matthew Bradley
(74) *Attorney, Agent, or Firm*—Patterson & Sheridan, LLP

(57) ABSTRACT

Methods, systems, and media for managing dynamic memory are disclosed. Embodiments may disclose identifying nodes with having memory for dynamic storage, and reserving a portion of the memory from the identified nodes for a heap pool. After generating a heap pool, embodiments may allocate dynamic storage from the heap pool to tasks received that are associated with one of the identified nodes. More specifically, embodiments identify the node or home node associated with the task, the amount of dynamic storage requested by the task, and create a heap object in the node associated with the task to provide the requested dynamic storage. Some embodiments involve de-allocating the dynamic storage assigned to the task upon receipt of an indication that the task is complete and the dynamic storage is no longer needed for the task. Several of such embodiments return the de-allocated dynamic storage to the heap pool for reuse.

8 Claims, 3 Drawing Sheets

METHODS, SYSTEMS, AND MEDIA FOR MANAGING DYNAMIC STORAGE

BACKGROUND OF THE INVENTION

1. Field of the Invention

The present invention generally relates to the field of dynamic storage of computer systems. More particularly, the present invention relates to methods, systems, and media for managing dynamic storage.

2. Description of the Related Art

Parallel processing generally refers to performing multiple computing tasks in parallel. Traditionally, parallel processing requires multiple computer systems with the resources of each computer system dedicated to a specific task or allocated to perform a portion of a common task. However, recent advances in computer hardware and software technologies have resulted in single computer systems capable of highly complex parallel processing by partitioning the system resources to different tasks.

From a software standpoint, multithreaded, or multi-tasked, operating systems and kernels have been developed, which permit computer programs, or applications, to concurrently execute multiple tasks of the applications. Tasks generally represent execution entities defining independent paths of execution for an application. For example, for an e-commerce computer application, different tasks might be assigned to different customers so that each customer's specific e-commerce transaction can be handled simultaneously.

A significant problem that can occur in a multi-processor computer, however, is associated with the transfer of data to and from each processor, often referred to as communication cost. Such bottlenecking is particularly prevalent when processors in a computer share the same main memory since all communications between the processors and the main memory occur over a common bus or interconnect. As the number of processors in a computer increases, the communication costs involved with traffic to the main memory increases, significantly impacting a bottleneck on system performance, irrespective of the use of intermediate caches.

One solution to the problem of bottlenecking is to distribute multiple main memories across a computer, physically grouping sets of processors and caches into physical subsystems referred as "nodes". The grouping of processors, caches and memory in each node provides relatively high-speed interaction between all of the components that are "local" to a node. The nodes are also coupled to one another over a network such as a system bus or a collection of point-to-point interconnects, thereby permitting processors in one node to access data stored in another node, thus effectively extending the overall capacity of the computer. Memory access, however, is non-uniform since the access time for data stored in a local memory (i.e., a memory resident in the same node as a microprocessor) is often significantly shorter than for data stored in a remote memory (i.e., a memory resident in another node).

Irrespective of the particular type of multi-processing architecture used, efficient utilization of the hardware resources in a computer often requires a collaborative effort between software and hardware. To ensure optimal performance, tasks are typically assigned (e.g., at the time they are created) to subsets of available computer resources in such a manner that the workload of the computer is evenly distributed among the available computer resources.

In most computer architectures, an operating system or kernel, and in particular, application code therein is responsible for allocating memory and processor resources to applications and their constituent tasks. In a multi-node architecture, for example, tasks can be assigned "home nodes", and the operating system or kernel will attempt to allocate memory and processor resources from a task's assigned home node to optimize hardware performance, minimize communication costs, and balance workload across the various nodes.

Dynamic storage, on the other hand, is managed separately from other resources. Dynamic storage involves allocating and freeing objects dynamically for use by an application and is accessed often by complex applications when, for example, the number and size of objects needed by the application are not known before compilation, or an object is too large to fit into a stack that is allocated during compilation. Heaps maintain dynamic storage for a computer system and are located within the memory of the nodes. The physical location of a heap with respect to the task using the heap, is critical to access times associated with dynamic storage, especially when considering the traffic on a system bus, and is thus, critical to the execution speed of tasks and applications in general. However, allocations for dynamic storage are physically distributed in heaps throughout the nodes based upon the availability of the dynamic storage without regard to the node within which a task utilizing dynamic storage is executed.

SUMMARY OF THE INVENTION

Embodiments of the invention are generally directed toward methods, systems, and media for managing dynamic memory. One embodiment provides a method for managing dynamic memory. The method generally includes identifying nodes having memory for heap storage; reserving the heap storage from the memory of the nodes for a heap pool; receiving a request for dynamic storage, the request being associated with a node of the nodes; and allocating a portion of the heap pool to the request based upon an association between the portion and the node.

Another embodiment provides an apparatus for managing dynamic memory. The apparatus may include a heap reserver to identify nodes having memory for heap storage and to reserve the heap storage from the memory of the nodes; a heap pool coupled with the heap reserver to maintain reservations of the heap storage; and a dynamic storage manager coupled with the heap pool to associate a request for dynamic storage with a node of the nodes and allocate a portion of the heap pool to the request based upon an association between the portion and the node.

A further embodiment provides a computer readable medium containing a application which, when executed, performs an operation. The operation may include identifying nodes having memory for heap storage; reserving the heap storage from the memory of the nodes for a heap pool; receiving a request for dynamic storage, the request being associated with a node of the nodes; and allocating a portion of the heap pool to the request based upon an association between the portion and the node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE
PREFERRED EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media for managing dynamic memory are contemplated. Embodiments may disclose identifying nodes having memory for dynamic storage, and reserving a portion of the memory from the identified nodes for a heap pool. After generating a heap pool, embodiments may allocate dynamic storage from the heap pool to tasks received that are associated with one of the identified nodes. More specifically, embodiments identify the node or home node associated with the task, the amount of dynamic storage requested by the task, and create a heap object in the node associated with the task to provide the requested dynamic storage. Some embodiments involve de-allocating the dynamic storage assigned to the task upon receipt of an indication that the task is complete and the dynamic storage is no longer needed for the task. Several of such embodiments return the de-allocated dynamic storage to the heap pool for muse.

Further, "dynamic storage" is also commonly referred to as "heap storage" and "free storage" and these terms are equivalent. For the purpose of clarity, however, the following discussion of the embodiments uses "dynamic storage" when referring generally to dynamic storage requested and "heap storage" when referring generally to dynamic storage gathered from nodes. Dynamic or heap storage is storage in memory like the main memory, cache, or the like, of a computer system that is set aside, at least temporarily, to satisfy dynamic storage requirements for the computer system.

Figure 1:
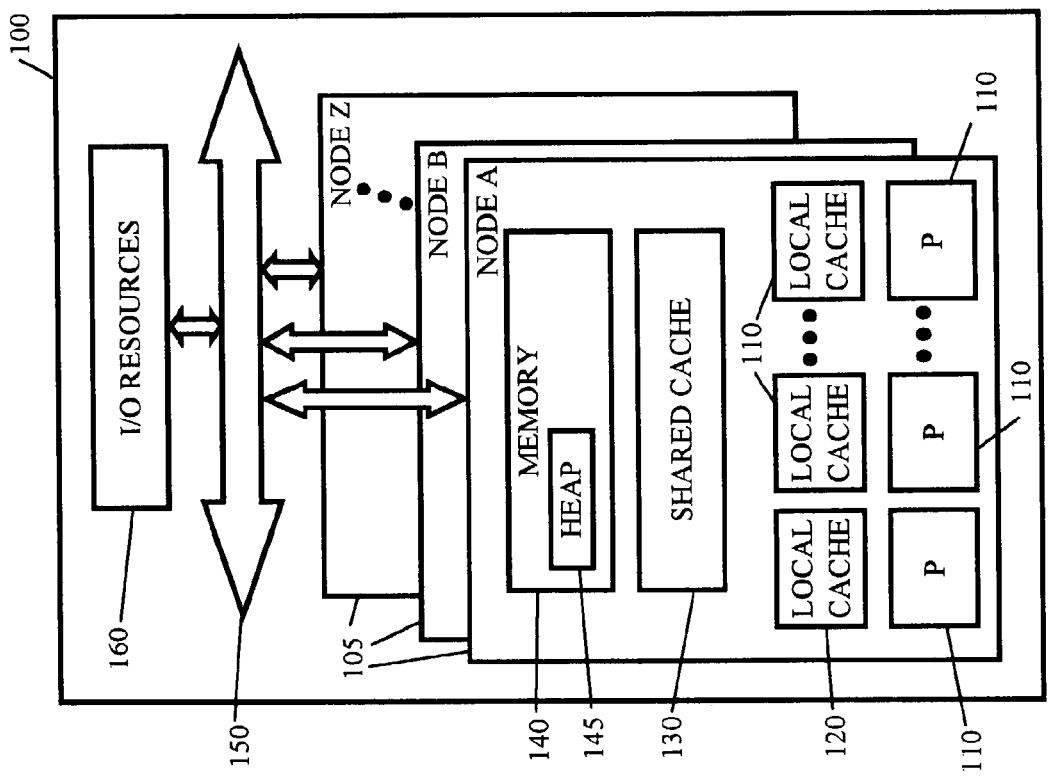
FIG. 1 is an embodiment of a computer system with one or more nodes.

Turning now to the drawings, FIG. 1 depicts an embodiment of a system 100 for managing dynamic storage. System 100 includes the principal hardware components of a computer. System 100 generically represents, for example, any of a number of multi-user computers such as a network server, a midrange computer, a mainframe computer, etc., e.g., an AS/400 or eServer iSeries midrange computer. However, it should be appreciated that embodiments may be implemented in other computers and data processing systems, e.g., in single-user computers such as workstations, desktop computers, portable computers, and the like, or in other programmable electronic devices (e.g., incorporating embedded controllers and the like).

System 100 includes multiple physical subsystems or nodes 105 coupled with one another over a system bus 150 or other communications interface, e.g., a fabric. In addition, system 100 may include various input/output (I/O) resources 160 such as storage devices, workstations, terminals, networks, imaging devices, etc.

Each node 105 includes a set of hardware resources, e.g., one or more processors 110, one or more levels of cache memory such as one or more local caches 120 and a shared cache 130, and a shared memory 140. In many embodiments, processors 110 and resources 120-140 in each node 105 may interact or communicate more efficiently with one another than interactions between, e.g., nodes A and B of nodes 105. For example, the resources in each node 105 may be disposed on the same multi-chip module (MCM) or circuit card, whereby the interconnections between such resources may be an order of magnitude or more faster than the interconnects coupled with system bus 150. Other methods of physically partitioning hardware resources may be implemented in other embodiments.

Memory 140 may be random access memory (RAM) like dynamic RAM (DRAM), synchronous DRAM (SDRAM), etc. Heap 145 may be a range of memory 140 allocated by processors 110 to satisfy dynamic memory requirements of applications executing in system 100. Heap 145 may include part of memory used outside of what is allocated for the code and stack during run-time, allocating and freeing objects dynamically for use by the application. For instance, heap 145 may be used when the number and size of objects needed by the application are not known ahead of time, an object is too large to fit into a stack, and the like.

Heap 145, or a portion thereof, may be reserved for a heap pool that maintains reservations for heap storage, or address space, from one or more nodes. In particular, nodes 105 like node B and node Z may include a heap like heap 145 for dynamic storage and a dynamic storage manager, like dynamic storage manger 216 of FIG. 2, may allocate and de-allocate heap via the heap pool in response to receipt of tasks that represent or include a request for dynamic storage.

Figure 2:
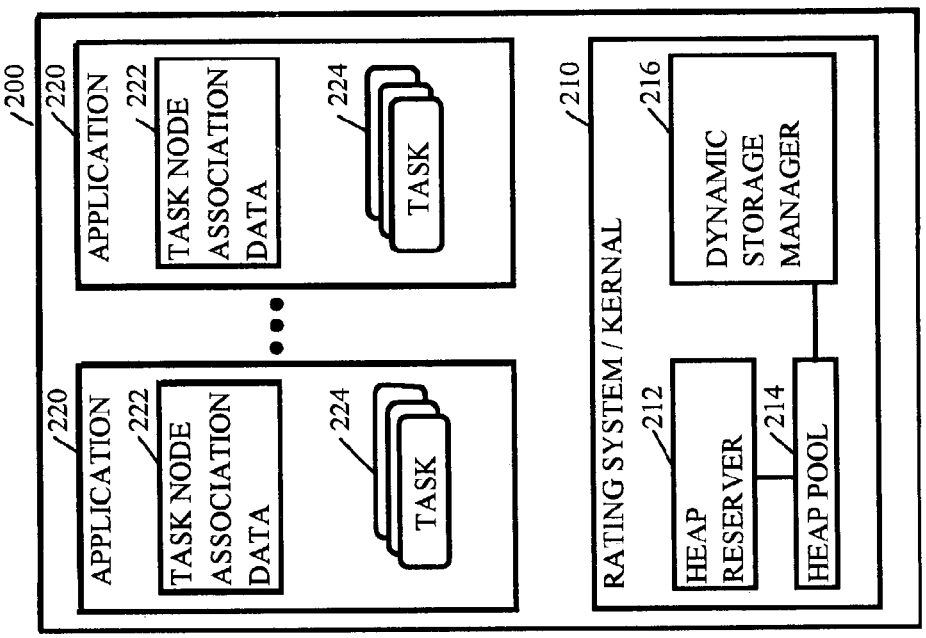
FIG. 2 is an embodiment of software architecture for a system such as the computer system of FIG. 1, to manage dynamic storage.

Referring now to FIG. 2, an example embodiment of software architecture 200 for a system such as computer system 100 is shown. Software architecture 200 may rely upon an operating system/kernel 210 upon which executes a plurality of applications 220. Operating system/kernel 210 may manage dynamic storage allocations for applications 220 and may include a heap reserver 212, a heap pool 214, and a dynamic storage manager 216.

Heap reserver 212 may identify nodes having heap storage and to reserve the heap storage from the nodes. Heap pool 214 may maintain pointers, handles, and/or other data for the reservations of the heap storage in each node to track segments in heap storage associated with each of the nodes. In many embodiments, the heap reserver 212 periodically rechecks the availability of nodes and heap storage within the nodes. Heap reserver 212 may then update reservations described in heap pool 214 based upon changes to the system like the removal or addition of hot-swappable nodes. In systems such as system 100 of FIG. 1, heap pool 214 may reside in one or more nodes in memory like local cache 110, shared cache 130, memory 114, an I/O storage device represented by I/O resources 160, or other memory associated with system 100.

Dynamic storage manager 216 may couple with heap pool 214, receive a request for dynamic storage that associated with a node like nodes A, B or Z, having heap storage reserved in the heap pool, and allocate a portion of the heap pool to the request based upon an association between that portion of the heap pool and the node. In other words, dynamic storage manager 216, typically resident within the operating system/kernel 210 of a computer, manages the allocation of dynamic memory for each application 220. For example, application 220 may execute task 224. Task 224 may include a request for an amount of dynamic storage and may be associated with node A as a home node via task node association data 222. Dynamic storage manager 216 recognizes the request for dynamic storage and the indication that node A is the home node for the task. In response, dynamic storage manager 216 allocates a segment of heap 145 (FIG. 1) to the task.

In other circumstances, task node association data 222 may associate task 224 with node Z rather than the home node of task 224 and include an identifier within task 224 to indicate that dynamic storage located in node Z is preferable. Dynamic storage in node Z may be preferable because, e.g., the task may pass data to another task being executed in node Z. Dynamic storage manager 216 may respond by verifying that heap pool 214 includes a reservation for heap storage in node Z and allocating heap storage from the heap of node Z to the task. Then, upon receipt of a notification to de-allocate the heap storage reserved for the task, dynamic storage manager 216 may release the heap storage, marking the heap storage as available in heap pool 214.

In the aforementioned eServer iSeries implementation discussed above, for example, dynamic storage manager 216 may be resident in the Licensed Internal Code (LIC) of such a computer. It will also be appreciated that the dynamic storage management functionality discussed herein may be incorporated into various other logical components in the operating system or kernel of a computer, e.g., in combination with a thread dispatcher, memory manager, etc., or in state machines. The discussion of the herein-described functionality in terms of its implementation within dynamic storage manager 216 in the operating system or kernel of a computer therefore does not limit the invention to such an implementation.

Applications 220 typically execute using one or more tasks 224 to perform a variety of operations. Applications 220 may include operating systems like OS/400, Linux, WebSphere, Microsoft Windows and the like, and/or applications designed to execute within an environment like OS/400, Linux, WebSphere, and Microsoft Windows. Moreover, task node association data 222 may be defined for applications 220.

Task node association data 222 may include data for associating tasks 224 with home nodes. In some embodiments, task node association data 222 also includes data to associate tasks 224 with a node other than a home node for tasks 222, for coordinating interactions between the task and other tasks of the same and/or other applications. Task node association data 222 may be represented in a number of manners. For example, task node association data 222 may be defined in an application using one or more variables, constants or other data structures. In the alternative, task node association data 222 may be inherently defined by the application code in applications 220.

In general, the routines executed to implement the embodiments, whether implemented as part of an operating system or a specific application, component, program, object, module or sequence of instructions, or even a subset thereof, may be referred to herein as applications. Applications typically comprise one or more instructions that are resident at various times in various memory and storage devices in a computer, and that, when read and executed by one or more processors in a computer, cause that computer to perform the operations to perform tasks embodied in various aspects of the invention. Furthermore, given the typically endless number of manners in which computer programs may be organized into routines, procedures, methods, modules, objects, and the like, as well as the various manners in which application functionality may be allocated among various software layers that are resident within a typical computer (e.g., operating systems, libraries, API's, applications, applets, etc.), it should be appreciated that the invention is not limited to the specific organization and allocation of application functionality described herein.

In other embodiments, for example, the computer system may include a cluster, or multiple servers linked together by high-speed links (HSLs) to operate a unified system. The cluster may include applications that execute on more than one server at the same time to provide application resiliency and store data on more than one system to provide data resiliency. Application and data resiliency may reduce and/or substantially eliminate downtime and loss of data resulting from planned and unplanned outages so outages will not disrupt services provided to a customer. In such embodiments, dynamic storage may be distributed throughout the cluster.

Figure 3:
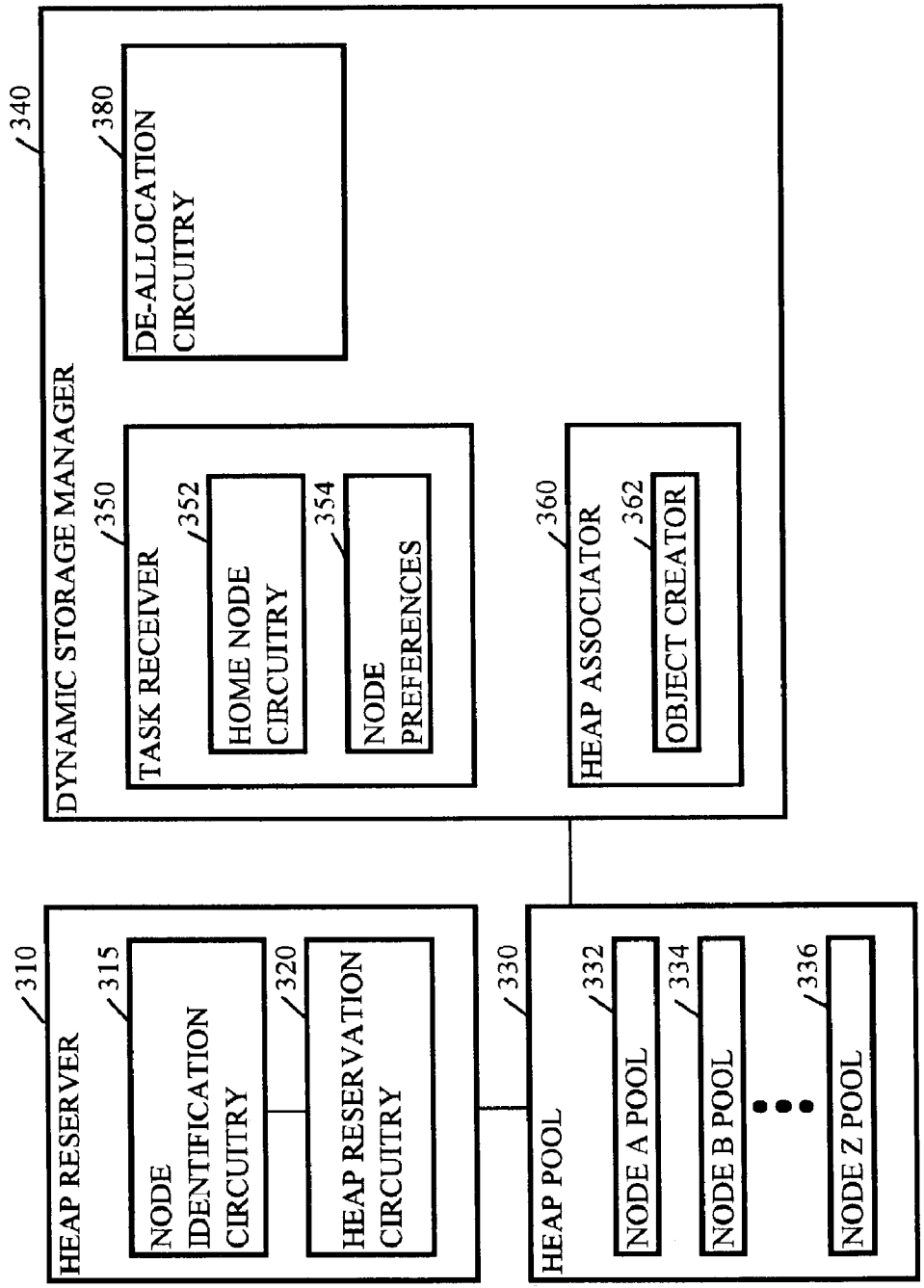
FIG. 3 is an embodiment of an apparatus including a dynamic storage manager coupled with a heap pool for managing dynamic storage.

Referring now to FIG. 3, there is shown an embodiment of an apparatus 300 for managing dynamic storage of a computer system having hardware organized in nodes. Some nodes include processors and memory, and the system may have allocated a portion of the memory for a heap. The heap provides applications executing on the system with additional, run-time memory. For example, when compiling an application, a task of the application may be allocated an amount of memory in a stack. However, upon executing the task, the application may determine that the amount of memory available in the stack is insufficient to process the task. Thus, the application includes a request for allocation of the heap to obtain enough memory to allow the task to execute.

Apparatus 300 includes a heap reserver 310, a heap pool 330, and a dynamic storage manager 340. Heap reserver 310 may identify nodes having memory for heap storage and may reserve the memory, or portions thereof, from the nodes for heap storage. In particular, before a task requests an amount of dynamic storage, heap reserver 310 reserves some or all of the heap storage available on one or more nodes of the system.

Heap reserver 310 may include node identification circuitry 315 and heap reservation circuitry 320. Node identification circuitry 315 may determine a node has heap storage by searching through each node of the computer system to find dynamic storage and, in some embodiments, may also monitor the availability of nodes and of memory in nodes for dynamic storage while the system is operating. For example, node identification circuitry 315 checks the topology of the system with the operating system to find nodes associated with the system and checks the configuration of each node to determine if the node has memory like random access memory and/or cache. Dynamic storage may be allocated in multiple locations to reduce bottleneck effects associated with having dynamic storage coupled with a single bus.

Upon locating a node with memory, heap reservation circuitry 320 may reserve a portion of the memory for heap storage. Heap reservation circuitry 320 may reserve part or all of the memory associated with one or more of the nodes in the system for heap storage. For instance, node identification circuitry 315 identifies a node from a system topology determined by system resource code, having memory with 64 megabytes available to designate as heap storage. Then, heap reservation circuitry 320 reserves a range of virtual addresses of the 64 megabytes and allocates a 64 kilobyte segment of the heap storage for data associated with management of the reservation. The data associated with management of the reservation may include, for example, the size or length of the heap storage, a node identification, a count of the heap objects in the heap storage, and/or other data to manage the contents of the heap storage.

Heap pool 330 may couple with heap reserver 310 to maintain reservations of dynamic storage. Heap pool 330 maintains data describing the amount and locations of heap storage available as well as pointers and/or handles for heap objects and/or other data stored in the heap storage. In the present embodiment, heap pool 330 includes node pools such as node A pool 332, node B pool 334, and node Z pool 336. For instance, heap storage may be reserved in node A 332. Node A pool 332 may include data such as the virtual address range associated with the heap storage of node A, a pointer, handle, and/or physical address indicating the beginning or control data of the heap storage reserved from node A, a range of virtual addresses associated with node A, and the amount of the reserved heap storage that has been allocated and/or is available for allocation in node A.

Dynamic storage manager 340 may couple with heap pool 330 to associate a request for dynamic storage with one of the nodes having reserved heap storage in heap pool 330 and allocate a portion of the heap storage to the request based upon an association between that portion of the heap storage and the node associated with the request. Dynamic storage manager 340 may include a task receiver 350, a heap associator 360, and de-allocation circuitry 380.

Task receiver 350 may receive a task having an identifier associating the task with a node having a reservation in heap pool 330 and an amount of dynamic storage requested for the task. For example, the task is generated by an application to obtain an amount of memory that could not be predicted during compilation of the application such as a "malloc" statement in the C programming language, a "new" statement in the C++ programming language, a "new" statement in the Pascal programming language, and the like. These statements may be incorporated, e.g., to obtain an input of an unknown size, and possibly type, from a user, such as an array with an undetermined number of elements or a block of text of variable size. At run-time, in response to interaction with the user, the application requests dynamic storage to accommodate the array or variable-sized text.

Task receiver 350 may include home node circuitry 352 and node preferences 354. Home node circuitry 352 may associate an identifier of the task with a home node. For instance, home node circuitry 352 may retrieve the data from the task that associates the task with a node identification or the like. Dynamic storage manager 340 then compares the node identification to node identifications associated with node pools of heap pool 330 to verify that the node has local heap storage, compares the amount of dynamic storage requested with the amount of local storage, and allocates heap storage from the corresponding node pool.

When the local heap storage does not, at that point, have sufficient heap storage to accommodate the task, further embodiments may include node preferences 354. Node preferences 354 may determine how to allocate dynamic storage based upon an indication of node preferences in the identifier associated with the task. In particular, the application that generated the task, rather than identifying a node like a home node and realizing that dynamic storage is not always available at the node of choice, may provide one or more preferences describing a method for selecting a node or describe when dynamic storage manager 340 should wait for the dynamic storage to become available or select another node to provide dynamic storage for the task. The preferences may include an allocation preference and a strength preference.

The allocation preference and strength preference may be associated with a particular application and apply to all instances, or executions of that application, or alternatively, may be associated with specific instances or executions, thereby permitting different executions of a given application to effectively operate under different dynamic storage allocation schemes.

An allocation preference includes sufficient information to identify a particular allocation scheme to be utilized when allocating dynamic storage for the application (i.e., to determine how the home resources will be selected). One such allocation scheme that may be identified, for example, is a scheme where created tasks preferably inherit the same node as other, already existing dynamic storage allocations (such as allocations for other tasks of the same application or another application interacting with that application).

A strength preference is used to determine whether to allocate alternate heap storage when an allocation preference specified by an application cannot be met. A strength preference may specify a specific strength value, e.g., to permit or prohibit the allocation of alternate heap storage when an allocation preference specified by an application cannot be met. In the alternative, in some implementations, more than two strength values may be specified, e.g., to define various degrees of allocation strength to be specified by an application. Also, in some implementations, a strength preference need not specify any particular strength value, and may instead specify a particular scheme, e.g., to enable created tasks to inherit the same strength value as other tasks.

In many instances, the allocation preference and strength preference specified by an application will be used to localize the hardware resources utilized by the application. Typically, localized resources will be logically grouped in a manner that provides optimal performance when such resources are used or accessed, as compared with other resources that are not-localized, i.e., that are remote to the localized resources. For a multi-node computer implementation, for example, a set of localized resources may consist of the processors and memory within a given node. In a single-node computer, localized resources may consist of individual processors or components of memory.

Upon selection of a node, heap associator 360, may allocate dynamic storage for the task. Heap associator 360 may determine an address range within heap pool 330 associated with the heap storage reserved from the node and allocate memory from that address range to the task. For example, heap associator 360 may receive a node identification and an amount of dynamic storage from task receiver 350, search nodes pools of heap pool 330 for a node pool associated with the node identification, and allocate an address range for the task from that node pool.

Heap associator 360 may include an object creator 362. Object creator 362 may create an object in the heap for the request in the address range and return a pointer or handle for the object. For instance, upon identification of an address range, object creator 362 stores control data like the size or length of the heap object; an indication of the object type; an indication of a number of elements if the heap object is an array, a pointer to the method block which points to the class block, the class block indicating the class of the object; flags to indicate whether the block can or has been moved, etc. After setting up the heap object, a pointer is returned to the task to point to the heap object for the task.

De-allocation circuitry 380 may de-allocate the heap object upon completion of a task associated with the request, for reuse by the heap pool. In many embodiments, de-allocation circuitry 380 receives the pointer to the heap object, accesses heap pool 330 to calculate the beginning of the segment allocated to the task, retrieves control data from the heap object, determines the address range and node identification for the heap object, and modifies heap pool 330 to indicate that the address range associated with the heap object in that node is available for allocation to another task.

Figure 4:
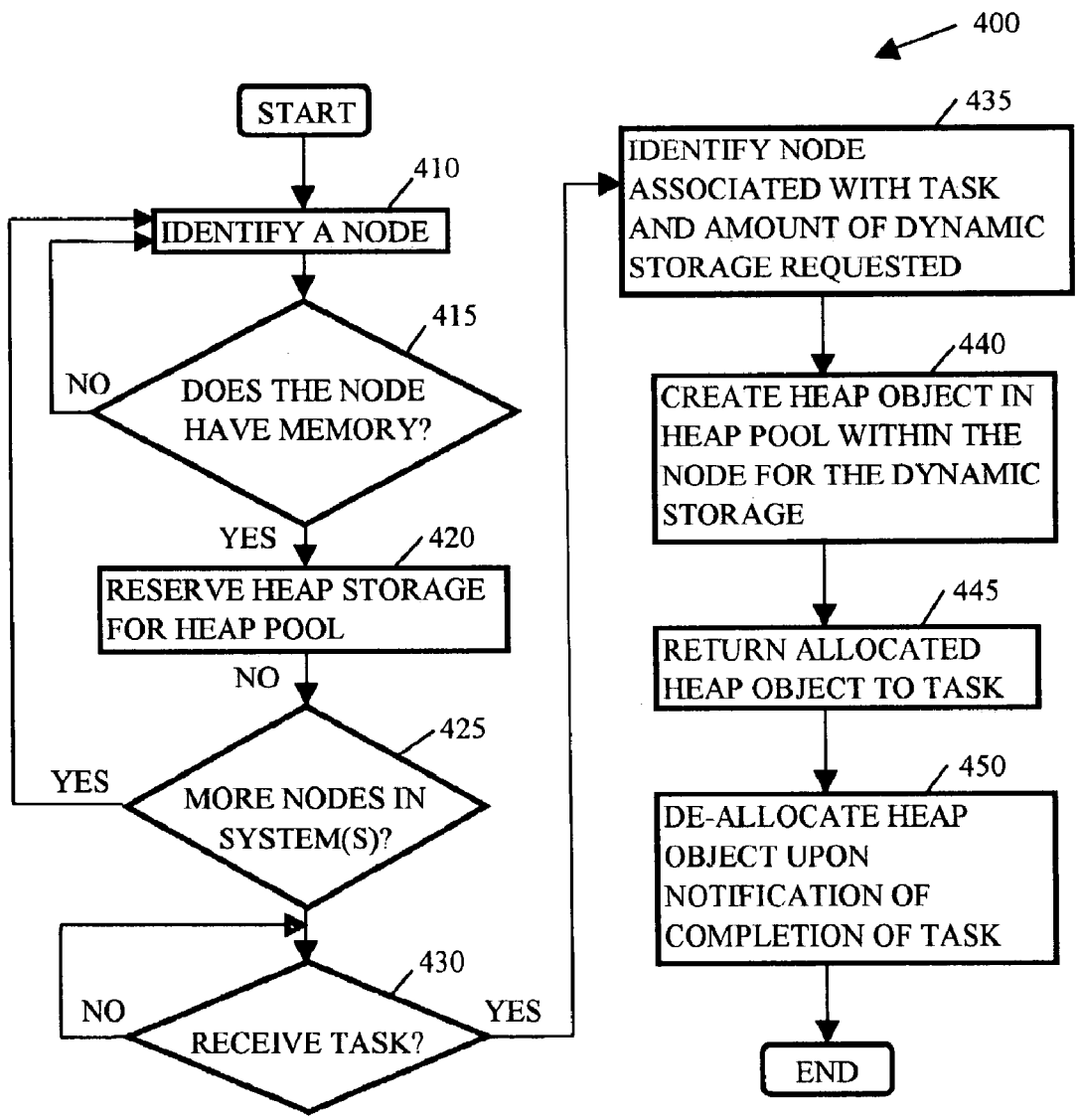
FIG. 4 depicts an embodiment of a method for managing dynamic storage.

FIG. 4 depicts an example flow chart 400 of a method for managing dynamic memory in a computer system. The computer system may have more than one heap location and each heap location is associated with a node. Flow chart 400 begins with element 410, identifying a node. In particular, nodes of the computer system may not all include memory for dynamic storage so element 410 may search the architecture and set up for nodes of the computer system and, upon locating a node, element 415 determines whether the node has memory to use for dynamic storage.

In element 420, heap storage is reserved for the node and the reservation for the heap storage is maintained in a heap pool. In many embodiments, reserving heap storage involves protecting a range of virtual addresses of memory associated with the node, identified for the heap storage, from allocation for other uses by a virtual address application program interface (API). A portion of the heap storage, e.g. 64 bytes, is also allocated to store control data. The control data facilitates management of the heap pool by the dynamic storage manager and may include storing data to describe the size of the segment, or amount of heap storage, reserved.

Maintaining the reservation in the heap pool contemplates storing an indication the heap pool to allow allocation by a dynamic storage manager. In some embodiments, an indication of the amount of the heap storage available, a link to the control data, and the virtual address range may be stored in the heap pool and associated with a node identification. For instance, the heap pool may comprise a binary tree type of data structure associated with each node via a node identification. A binary tree, sometimes referred to as a free tree, may impose no limit to the number of block sizes supported, allowing a wide range of potential block sizes. Adding a reservation to the heap pool may involve creating a binary tree associated with a node identification for the node from which heap storage is reserved and inserting an entry for the amount of heap storage. When more than one heap storage are associated with a node, entries may be organized by the amount of heap storage.

Decision element 425 determines whether further nodes in the computer system should be checked for heap storage. When further nodes are available, heap storage is reserved in each of the remaining nodes having a heap.

Decision element 430 waits for a task requesting dynamic storage and, upon receiving a task, element 435 identifies a node associated with the task, as well as the amount of dynamic storage requested by the task. The task may include an identifier to associate the task with the node and/or node preference and an amount of dynamic storage. For example, applications executing in the computer system may attempt to localize resources such as processors and memory on a task per task basis task to reduce communication costs and/or the chance of bottlenecking. Thus, the application may indicate a node wherein the dynamic memory should be located for a task and preserving the locations of heap storage may reduce the number of operations necessary to determine the node associated with the heap storage.

When the indication of a node is in the form of a node preference, the node to associate with the task may be based upon an algorithm indicated by the node preference or a default algorithm. The algorithms may associate the heap storage for the task in the same local area of the computer system as other tasks, in different areas to avoid bottlenecking, or in the same local area as other tasks generated by the same application or by another application that interacts with that application. For example, applications such as engineering or scientific applications tend to be highly processor and memory intensive, and require a substantial number of memory accesses during execution. For these types of applications, it has been found that the amount of memory accesses by the multiple tasks executing in such applications make it more advantageous to localize, whenever possible, all of processor and memory resources utilized by such tasks, e.g., for a multi-node computer, within the same node, or for a single-node computer, within a limited subset of processor and memory resources. Thus, spreading tasks and dynamic storage out among a larger set of hardware resources may incur greater communication costs, and degrade overall system performance.

In contrast, applications such as commercial or interactive applications, e.g., transaction processing applications, database applications, etc., do not tend to be as processor and memory intensive as engineering or scientific applications. Often, a greater concern with such applications is consistent response time, and as a result, if a local processor or memory resource is not available for a particular task for an application, it may be more desirable to allow that task to utilize other available hardware resources, even if such resources are not local with respect to the hardware resources utilized by other tasks for the application.

Moreover, some applications may rely on data that is shared with other applications and/or by multiple tasks within the same application. When such data sharing represents a significant component of application performance, it is often desirable to localize the hardware resources utilized for all of the applications and/or tasks that share the data, and thus maximize the performance of all of such applications. For applications that do not share significant data, this concern is not as great.

After determining a node associated with the task via the node or node preference, element 440 may allocate a portion of the heap pool to the request based upon an association between the portion and the node. Allocating the portion of the heap pool may involve determining a virtual address range within the heap pool that is associated with heap storage reserved from that node. For example, when the heap pool includes a binary tree type of data structure associated with the node, locating heap storage within the binary involves searching the leftmost value (heap storage size) of the binary tree. A value greater than or equal to the amount of dynamic storage can be selected for the task and when the heap storage size is greater than the amount of dynamic storage, the heap storage may be split, leaving the unused portion available in the heap storage for a subsequent task.

After locating the heap storage, element 440 creates a heap object for the request in the virtual address range associated with the node. In particular, element 440 stores a header in the segment of the heap storage associated with the virtual address range that describes the data to be stored in the segment such as an offset for the object data and the class of the object or, when the object is an array, offsets for the elements of the array. Then, element 445 returns a pointer for the heap object to the task.

Element 450 involves de-allocation of the virtual address range associated with the heap object upon completion of the task associated with the request, to return the portion to the heap pool. In several embodiments, the heap storage allocation is de-allocated by the application upon completion of the task to free the heap storage for subsequent tasks. When the heap pool associates heap storage of nodes via a binary tree data structure, the heap object may be de-allocated by indicating that the heap object is no longer in use. For example, the notification that the task no longer needs the heap object may include the pointer to the heap object and the heap object may include a node identification in the header to facilitate locating the heap storage allocation in the heap pool. The dynamic storage manager locates the binary tree associated with the node identification, searches for the allocation associated with the task, and changes an in use flag to indicate that the virtual address range can be reused.

Further embodiments include coalescing the virtual address range with another virtual address range within the same node to increase the size of the segment in the heap storage available for later tasks. For example, when heap storage associated with the same node, is allocated to multiple tasks, the heap storage of the heap may become fragmented. Coalescing, or combining, fragments of the heap storage available can facilitate larger allocations of heap storage for a subsequent task.

One embodiment of the invention is implemented as a application product for use with a computer system such as, for example, the system 100 shown in FIG. 1 and described below. The program(s) of the application product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer application of the present invention typically is comprised of a multitude of instructions that will be translated by the native computer into a machine-readable format and hence executable instructions. Also, programs are comprised of variables and data structures that either reside locally to the application or are found in memory or on storage devices. In addition, various programs described hereinafter may be identified based upon the application for which they are implemented in a specific embodiment of the invention. However, it should be appreciated that any particular application nomenclature that follows is used merely for convenience, and thus the invention should not be limited to use solely in any specific application identified and/or implied by such nomenclature.

While the foregoing is directed to embodiments of the present invention, other and further embodiments of the invention may be devised without departing from the basic scope thereof, and the scope thereof is determined by the claims that follow.

What is claimed is:

1. A method for managing memory, the method comprising:
    identifying a plurality of nodes each having a respective processor and respective memory for heap storage;
    reserving the heap storage from the memories of the nodes in a heap pool, the heap pool comprising:
        a description of nodes having memory for heap storage;
        a description of available memory for heap storage;
        a description of memory being used for heap storage; and
        control information for managing heaps;
    receiving a request from an application for heap storage, the request being associated with a at least one node of the plurality of nodes, the association between the request and the at least one node being defined in a task node association data structure of the application; and
    allocating a portion of the heap storage from the heap pool to the request based upon the association between the request and the at least one node as defined in the task node association data structure.

2. The method of claim 1, further comprising de-allocating the portion upon completion of a task associated with the request, to return the portion to the heap pool.

3. The method of claim 1, wherein identifying the plurality of nodes comprises identifying the at least one node from a system topology and determining the node has the respective memory.

4. The method of claim 1, wherein reserving the heap storage comprises:
    identifying a range of virtual addresses of the heap storage associated with the at least one node; and
    storing the range with a node identification for the at least one node in the heap pool.

5. The method of claim 1, wherein receiving the request comprises receiving a task having an identifier that associates the task with the at least one node and an amount of dynamic storage.

6. The method of claim 1, wherein receiving the request comprises receiving a task having an identifier associating the task with a home node, wherein the home node is the at least one node.

7. The method of claim 1, wherein allocating the portion of the heap storage from the heap pool comprises determining an address range of the heap storage reserved in the heap pool.

8. The method of claim 7, wherein allocating the portion of the heap storage from the heap pool further comprises creating an object for the request in the address range and returning a pointer for the object to the request.

* * * * *